(No Model.)

J. HILLS.
CONNECTION OF STEAM COCK VALVES AND SPINDLES.

No. 247,760. Patented Oct. 4, 1881.

Witnesses.
S. N. Piper
E. P. Pratt

Inventor.
Jacob Hills.
by R. H. Eddy atty.

UNITED STATES PATENT OFFICE.

JACOB HILLS, OF HAYDENVILLE, MASSACHUSETTS.

CONNECTION OF STEAM-COCK VALVES AND SPINDLES.

SPECIFICATION forming part of Letters Patent No. 247,760, dated October 4, 1881.

Application filed July 8, 1881. (No model.)

*To all whom it may concern:*

Be it known that I, JACOB HILLS, of Haydenville, of the county of Hampshire and State of Massachusetts, have invented a new and useful Improvement in the Connections of Steam-Cock Valves and Spindles; and I do hereby declare the same to be described in the following specification and represented in the accompanying drawings, of which—

Figure 1:
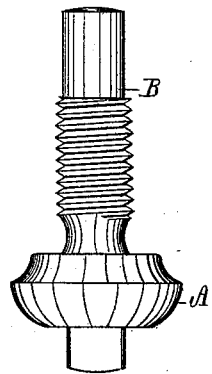
Figure 2:
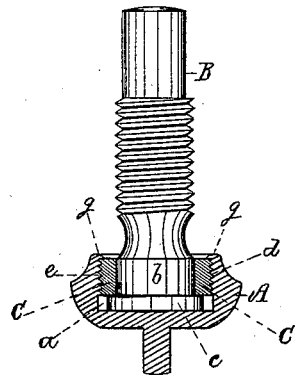
Figure 3:
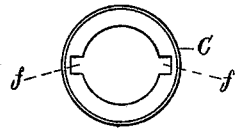

Figure 1 is a side view, and Fig. 2 a vertical section, of a gage-cock valve and its spindle provided with my invention. Fig. 3 is a top view of their connecting-ring, to be described.

In carrying out my improvement I combine the valve with its separate spindle by a ring encompassing the latter above its flange and screwed into the valve, and after having inserted the ring in place in the valve I turn over or spin down upon the said ring the upper part of the said valve, so as to form a shoulder to extend over and upon the ring, in order to prevent it from becoming accidentally unscrewed from its socket in the valve.

Prior to my invention the nut or ring has been formed with a prismatic head and screwed into the valve until the head abutted against the top of the valve. As the valve-spindle, when revolved, turned in and independently of the valve, there has been a constant liability of the nut or ring becoming accidentally unscrewed, so as to disengage the valve from connection with its stem or spindle, such a result being of frequent occurrence, to the serious inconvenience and annoyance of the user of the cock containing the valve and spindle. With my invention such cannot occur, as the valve cannot become detached from the spindle by the working of the latter.

In the said drawings, A denotes the valve, and B the spindle, the said valve having within it a cylindrical chamber, *a*, to receive the lower or flanged portion, *b*, of the spindle, whose flange is shown at *c*.

In the periphery of the chamber *a* a female screw, *d*, is cut, to receive the male screw *e*, formed on the circumference of the connecting-ring C. The ring, as shown in the drawings, is without any prismatic head, and is a cylindrical annulus, having a male screw cut on its outer circumference. The said ring also has two notches, *f f*, made in it to receive the studs or projections of a wrench to be used in screwing the ring into place. The ring so made is to fit loosely upon the part *b* of the spindle, and to cover the flange *c* thereof. After the ring may have been screwed into the valve to a short distance below the upper edge of the latter, such edge is to be riveted down or spun or forced over upon the upper face of the ring, so as to form a shoulder or flange, as shown at *g*, to extend over the ring, and thus prevent it, by the working of the spindle, from being turned out of its socket or place in the valve in a manner to cause the spindle and valve to become disengaged.

I do not claim the combination of the valve and its spindle by means of a ring encompassing the latter above its flange and screwed into the valve, nor by a collar encompassing the spindle and screwed on the valve, as my invention embraces more than such a ring so applied—that is to say, it includes the addition of the shoulder *y*, formed in manner as described. Therefore

I claim as my invention—

1. The combination of the spindle B, provided with the flange *b*, with the connecting-ring C, having the male screw *e*, and with the valve provided with the chamber *a*, female screw *d*, and shoulder *g*, all being arranged and adapted substantially as set forth.

2. The combination of the spindle B, provided with the flange *b*, with the connecting-ring C, having the male screw *e* and the notches *f f*, and with the valve chambered and provided with the female screw *d* and the shoulder *g*, all being adapted substantially as shown and described.

JACOB HILLS.

Witnesses:
T. M. CARTER,
C. J. HILLS.